(12) United States Patent
Stender

(10) Patent No.: US 9,504,239 B2
(45) Date of Patent: Nov. 29, 2016

(54) FISHING ROD WITH SPIRAL FISHING LINE GUIDES

(71) Applicant: Scott Stender, Anchorage, AK (US)

(72) Inventor: Scott Stender, Anchorage, AK (US)

(*) Notice: Subject to any disclaimer, the term of this patent is extended or adjusted under 35 U.S.C. 154(b) by 0 days.

(21) Appl. No.: 14/247,290

(22) Filed: Apr. 8, 2014

(65) Prior Publication Data

US 2014/0360085 A1 Dec. 11, 2014

Related U.S. Application Data

(60) Provisional application No. 61/831,444, filed on Jun. 5, 2013.

(51) Int. Cl.
*A01K 87/04* (2006.01)
*A01K 87/02* (2006.01)

(52) U.S. Cl.
CPC ............ *A01K 87/04* (2013.01); *A01K 87/025* (2013.01)

(58) Field of Classification Search
CPC .... A01K 87/00; A01K 87/02; A01K 87/025; A01K 87/04
USPC .................................. 43/18.1 CT, 18.1 R, 24
See application file for complete search history.

(56) References Cited

U.S. PATENT DOCUMENTS

| | | | | |
|---|---|---|---|---|
| 291,819 A * | 1/1884 | Turrell | ................ | E21B 17/0426 279/99 |
| 2,878,608 A * | 3/1959 | O'Brien, Jr. | ............ | A01K 87/04 43/24 |
| 3,315,400 A * | 4/1967 | Axelson | .................. | A01K 87/04 43/24 |
| 4,261,129 A * | 4/1981 | Ohmura | .................. | A01K 97/08 43/25 |
| 5,259,140 A * | 11/1993 | Epperson | ............. | A01K 87/025 43/18.1 CT |
| 5,276,991 A * | 1/1994 | Stotesbury | ............. | A01K 87/04 43/24 |
| 5,311,695 A * | 5/1994 | Yasui | ...................... | A01K 87/04 43/24 |
| 5,417,007 A | 5/1995 | Stotesbury | | |
| 5,564,214 A | 10/1996 | Tsurufuji | | |
| 6,269,585 B1 | 8/2001 | Yasui | | |
| 6,543,178 B2 | 4/2003 | Sunaga | | |
| 6,973,750 B1 * | 12/2005 | Kim | ...................... | A01K 87/025 43/23 |
| 7,913,442 B2 * | 3/2011 | Roth | ...................... | A01K 87/04 43/24 |
| 2008/0005953 A1 * | 1/2008 | Anderson | .............. | A01K 87/04 43/24 |

OTHER PUBLICATIONS

"What's an 'Acid Rod'?", <http://www.acidrod.com/acidrods.html>, Retrieved from Waybackmachine, archived May 5, 2005.*

* cited by examiner

*Primary Examiner* — Christopher P Ellis
*Assistant Examiner* — Michael Wang
(74) *Attorney, Agent, or Firm* — Global Intellectual Property Agency, LLC; Daniel Boudwin

(57) ABSTRACT

Disclosed is an improved fishing rod adapted to increase the durability of the fishing rod and fishing line and to improve casting distance and accuracy. The fishing rod comprises an elongated cylindrical rod blank having a working end and a terminal end, wherein the working end is attached to a handle. The rod blank further comprises a plurality of fishing line guides disposed in a gradual spiral configuration along the length of the rod blank. The fishing line guides are adapted to receive a fishing line therethrough. The guides are also low profile so as to minimize snagging. When in use, the fishing line wraps around the rod blank, thereby evenly distributing the weight of the fishing line around the rod. In this way, the present invention eliminates line memory and increases the tensile strength of the rod blank and the fishing line.

17 Claims, 4 Drawing Sheets

FISHING ROD WITH SPIRAL FISHING LINE GUIDES

CROSS REFERENCE TO RELATED APPLICATION

This application claims the benefit of U.S. Provisional Application No. 61/831,444 filed on Jun. 5, 2013. The above identified patent application is herein incorporated by reference in its entirety to provide continuity of disclosure.

BACKGROUND OF THE INVENTION

Field of the Invention

The present invention relates to fishing rod devices. More specifically, the present invention pertains to an improved fishing rod that increases the tensile strength of the fishing rod blank and a fishing line, wherein the location of the fishing line guides are improved over existing fishing rod devices. The fishing rod of the present invention is designed for use with various types of fishing lines to accommodate different types of fishing, thereby providing versatility to the user with regards to the use of the device.

Fishing is a popular recreational activity. The most common form of recreational fishing is done with a rod, reel, line, hook, guides, and any one of a wide range of baits. Fishing rods are one of the most important pieces of equipment in fishing, and are made from a variety of materials such as bamboo, graphite, fiberglass, or composite. The purpose of the rod is to provide stability and power when casting the fishing line. Additionally, the rod acts as a buffer and absorbs the tension created when catching a fish.

The fishing line guides are disposed along the length of the rod, and the guides are adapted to receive a fishing line therethrough. The purpose of the fishing line guides is to support and guide the fishing line along the length of the rod. Most conventional fishing rods include fishing line guides that are arranged in a straight line along the length of the rod, creating a straight pathway for the fishing line. However, it is recognized that the linear configuration of the fishing line guides results in dead weight hanging from the end of the rod. In some cases, excessive stress or the pulling force caused by the dead weight on the fishing line can cause line or rod breakage. Repairing and reinforcing a broken line or a broken rod, however, is impractical as it does not provide a long term solution to the user and the assembly must be replaced.

Additionally, the linear configuration of the fishing guides tends to increase the tangling and twisting of the fishing lines. This often results in under or over casting when flicking the rod from behind toward the water because tangled and twisted lines can cause the reel to jam or malfunction. As a result, conventional fishing rods having fishing line guides in a linear configuration reduce the efficiency of casting bait into the water and the overall performance of fishing.

The present invention provides a fishing rod having a plurality of fishing line guides disposed along the length of the rod in a spiral configuration. In a preferred embodiment, the device comprises an elongated cylindrical rod blank having a terminal end and a working end. The working end of the rod includes a hook keeper adapted to secure a fish hook when the device is not in use. The working end also includes a handle attached thereto. Along the length of the rod is a plurality of fishing line guides adapted to receive a fishing line therethrough. The fishing line guides are positioned around the length of the rod so that it is gradually incremented in a spiral. Once the fishing line is threaded through the fishing line guides of the present invention, the fishing line is substantially wrapped around the rod and the weight of the line is evenly distributed around the rod. In this way, the weight distribution prevents dead weight and allows the user to utilize the fishing rod as a reinforced unit, increasing the tensile strength of the rod. Additionally, the spiral configuration of the fishing line guides helps prevent line breakage by reducing tangling of the fishing line and eliminates line memory. The present invention is ideal for use during various types of fishing, including light, medium, and heavy salt water or fresh water fishing, as well as surface fishing, bottom fishing, and fly fishing. Accordingly, the fishing line guides may be positioned in a spiral configuration on a wide variety of rods having different lengths and comprising numerous materials.

Description of the Prior Art

Devices have been disclosed in the prior art that relate to fishing poles comprising fishing line guides adapted to improve the experience and performance of fishing. These include devices that have been patented and published in patent application publications, and generally relate to fishing rods with various types of reinforcement measures to prevent breakage of fishing lines and rods. Some of these devices describe intra-line fishing rods with a hollow internal cavity for a fishing line. Other devices describe fishing rods with reinforced eyelets that are positioned on one side of the fishing rod. These devices, however, do not disclose a fishing rod with fishing line guides that are incrementally spaced in a spiral configuration around the length of the fishing rod, which improve the accuracy of the casts and increase the durability of the fishing rod. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 5,564,214 to Tsurufuji discloses an inter-line fishing rod that can hold annular fishing line guide members inside of a tubular fishing rod. The fishing line guide members are annular in shape and are mounted on the inner surface of a tubular rod along its length. In this way, the fishing line passes through the guide members disposed linearly along the inner surface of the tubular fishing rod. Accordingly, the fishing line guide members provide a longitudinal retaining force in one direction with respect to the tubular fishing rod.

Similarly, U.S. Pat. No. 6,269,585 to Yasui discloses a fishing rod comprising a tubular rod, an inner rod, and fishing line guides. The inner rod has a fishing line guiding passage therethrough, and is fitted in or detached from the tubular rod. The fishing line guides project toward a center axis in the fishing line guiding passage, and are fitted in or detached from the tubular rod. When the inner rod and the fishing line guides are attached in the tubular rod, the inner rod and the fishing line guides are positioned in an axial direction. Accordingly, a fishing line that is held by the fishing line guides within the tubular rod is drawn out or pulled back through an opening at the tip of the rod in a linear direction.

Another device, U.S. Pat. No. 7,913,442 to Roth discloses line guides for fishing rods, which comprises a system of roller assemblies within a frame, wherein the roller assemblies are configured to form a passageway for the fishing line to pass through. As an angler reels in a fish and the fishing line is in contact with one of the roller assemblies, the tension of the fishing line will cause a component of the roller assembly to rotate, thus greatly reducing any sliding friction between the fishing line and the line guide.

The foregoing Tsurufuji, Yasui, and Roth devices are directed toward line guides that are disposed in a linear formation along the connected fishing rod blanks. The linear formation of the line guides results in dead weight hanging from the end of the fishing rod, which can cause the line to twist and tangle, leading to inaccurate casts, uneven weight distribution, and rod and line breakage. The present invention provides line guides that are incrementally spaced in a spiral configuration along the length of the fishing rod. In this way, the line guides distribute the weight of the line and cast evenly around the entire length of the rod, reducing rod and line breakage and improving both casting distance and accuracy. Additionally, the location of the fishing line guides increase sensitivity to the rod by applying the pulling force to the entire length of the rod rather than applying the pulling force to only the end of the fishing rod. As the devices disclosed in Tsurufuji, Yasui, and Roth are limited in the fact that the line guides are disposed in a linear formation along the fishing rod blanks, these prior art devices do not address the problem solved by the present invention.

U.S. Pat. No. 6,543,178 to Sunaga discloses an intra-line fishing rod comprising a rod tube having a synthetic resin as a matrix that is reinforced by fibers. The fishing line guides are formed integrally with the rod tube and project from an inner surface of the rod tube. A cushioning portion is formed between the fishing line guide and a body layer of the rod tube which is composed predominantly of axially-extending fibers, and cushioning portions are formed respectively at front and rear sides of the fishing line guide connected to the inner surface of the rod tube. The cushioning portions help decrease a frictional resistance to a fishing line when the fishing line is passed through the fishing line guides disposed within the rod tube, thereby preventing the fishing line from becoming damaged. The Sunaga device, however, is limited in the fact that the fishing line guides cannot be constructed in a spiral formation. Rather, the fishing line guides are formed integrally with the rod tube. In this way, the Sunaga device is prone to rod breakage and inaccurate casts. The present invention radically improves the durability of the fishing rod by providing a plurality of fishing line guides that are incrementally spaced in a gradual spiral formation around the length of the rod. The spacing of the fishing line guides enhances the strength of the fishing rod, allowing the fishing rod to become more resistant to wind and barometric pressure during use.

Finally, U.S. Pat. No. 5,417,007 to Fettes discloses a line guide and a fishing rod blank combination. The line guide comprises connector means to attach to a rod blank, wherein the connector means comprises epoxy-receiving pockets to adhere to the rod blank. In another embodiment, each guide may comprise a synthetic resin frame having an underside generally shaped to seat on a cylindrical upper surface portion of the fishing rod blank. Use of epoxy in the pockets and in contact with the underlying blank greatly increases the strength of the guide-blank connection. While the guides disclosed in Fettes are constructed to increase the strength of the fishing rod blank, the purpose and design of the Fettes device diverges in intent and design from the present invention, which discloses a plurality of line guides disposed in a spiral configuration around the outer surface of a fishing rod blank. While it is desired to maintain a high strength of the guide-blank attachment, the present invention focuses on the placement of the line guides rather than the connector means disposed on the line guides.

The present invention provides a fishing rod comprising a plurality of fishing line guides adapted to evenly distribute the weight of the fishing line. The fishing line guides are low profile to minimize snagging. The fishing line guides are also positioned around the length of the rod so that it is in a spiral configuration rather than a linear configuration. This is advantageous because the present invention increases the tensile strength of the rod and prevents rod breakage. The present invention also inhibits the fishing line from tangling, which leads to less line breakage. Furthermore, the spiral configuration of the fishing line guides provides a more ergonomic design and increases rod sensitivity. The present invention allows the entire rod to work as a unit instead of isolating the tip of the rod. In this way, the present invention improves the overall durability and performance of the fishing rod, thereby allowing users, including those with limited range of mobility, to effectively cast and reel during fishing.

It is submitted that the present invention is substantially divergent in design elements from the prior art, and consequently it is clear that there is a need in the art for an improvement to existing fishing rod devices. In this regard, the instant invention substantially fulfills these needs.

SUMMARY OF THE INVENTION

In view of the foregoing disadvantages inherent in the known types of fishing rod devices now present in the prior art, the present invention provides a new fishing rod wherein the same can be utilized for improving the accuracy of casting and enhancing the strength of the fishing rod, thereby increasing its durability.

It is therefore an object of the invention to provide a new and improved fishing rod device that has all of the advantages of the prior art and none of the disadvantages.

It is another object of the present invention to provide a new and improved fishing rod device with fishing line guides that are incrementally spaced in a spiral configuration around the length of the fishing rod.

Another object of the present invention is to provide a new and improved fishing rod device that increases the tensile strength of the fishing rod while minimizing the amount of stress exerted thereon by evenly distributing the weight of the fishing line and cast.

Yet another object of the present invention is to provide a new and improved fishing rod device that reduces fishing line breakages and tangling by guiding the fishing line around the fishing rod in a gradual spiral.

Still yet another object of the present invention is to provide a new and improved fishing rod device having fishing line guides that are low profile so as to prevent the fishing line guide from snagging or catching onto extraneous objects.

Still yet another object of the present invention is to provide a new and improved fishing rod device having fishing line guides that reduce or eliminate line memory of the fishing line.

Still yet another object of the present invention is to provide a new and improved fishing rod device having fishing line guides that are suitable for various types of fishing.

A final object of the present invention is to provide a new and improved fishing rod device that improves both casting distance and accuracy.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
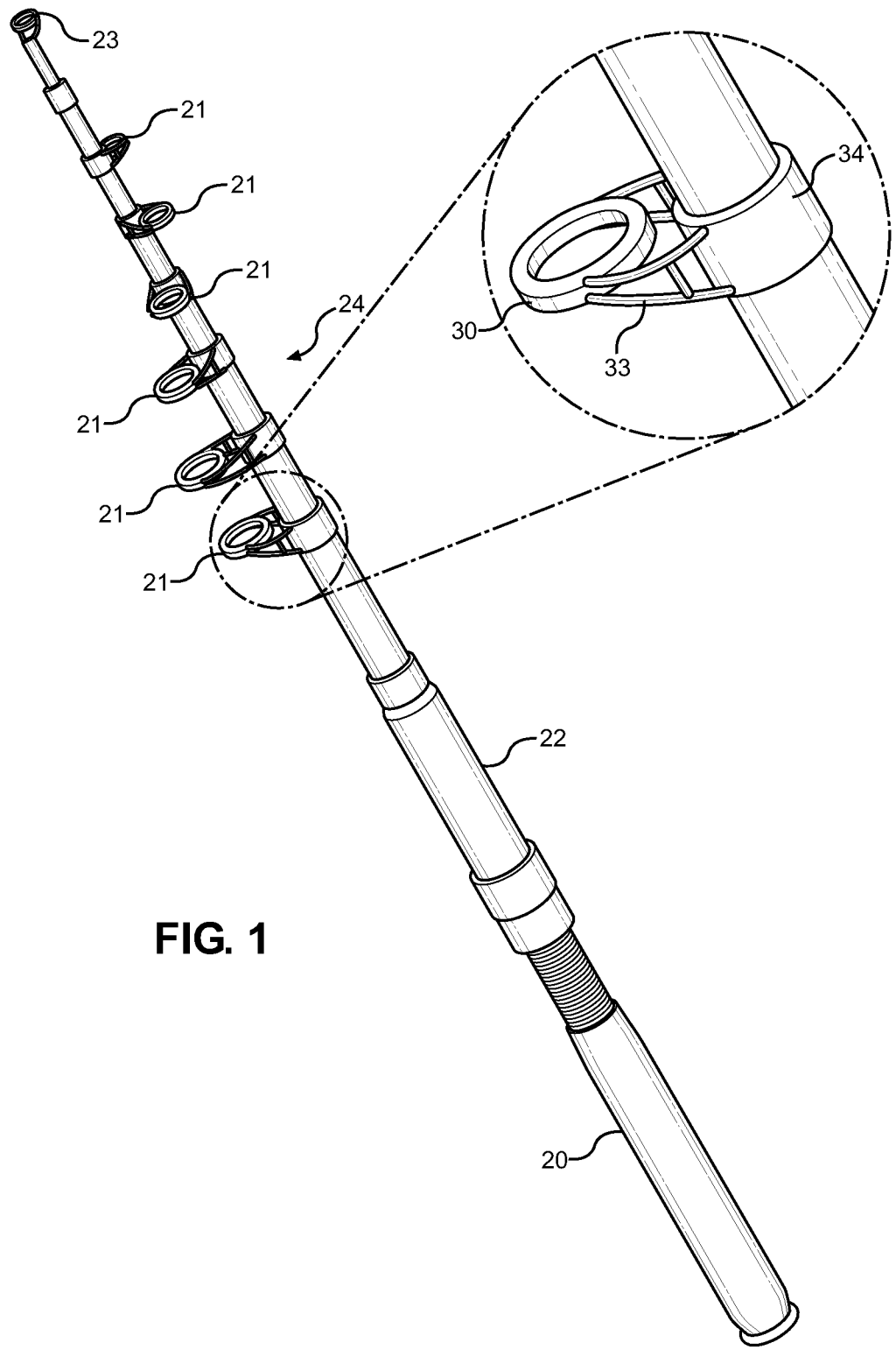
FIG. 1 shows a perspective view of the preferred embodiment of the present invention.

References is made herein to the attached drawings. Like reference numerals are used throughout the drawings to depict like or similar elements of the fishing rod device. For the purposes of presenting a brief and clear description of the present invention, the preferred embodiment will be discussed as used for increasing durability of the fishing rod and providing an improved casting distance and accuracy. The figures are intended for representative purposes only and should not be considered to be limiting in any respect.

Referring now to FIG. 1, there is shown a perspective view of the preferred embodiment of the fishing rod 24 of the present invention. The fishing rod 24 comprises an elongated rod blank 22, wherein the rod blank 22 comprises bamboo, graphite, fiberglass, composite, or other suitable material. The rod blank 22 is a tapered shaft having a circular cross section with a diameter that varies over the axial length of the rod blank 22. The fishing rod blank 22 may be offered in different lengths to accommodate the preference of a user and provide a rod that is well-suited for various types of fishing, including light, medium, and heavy salt water or fresh water fishing, as well as surface and bottom fishing. In the illustrated embodiment, the fishing rod 24 comprises a single piece rod blank 22.

The rod blank 22 includes a working end and a terminal end. In the illustrated embodiment, the rod blank 22 tapers toward the terminal end, such that the diameter of the terminal end is narrower than the diameter of the working end. Additionally, the working end is attached to a handle 20. The handle 20 may be press fitted to the working end or attached via a variety of fastening means such as screws or epoxy. In this way, the handle 20 may be removably affixed to the rod blank 22. The handle 20 is shaped to provide a comfortable and secure gripping. Additionally, the handle 20 may comprise a high friction surface to prevent slipping and improve the user's grip on the fishing rod. The terminal end of the rod blank 22 comprises a tip top 23, which comprises an annular body 30 and an attachment portion that rests directly on or near the terminal end of the rod blank 22. The tip top 23 is adapted to receive a fishing line therethrough, so that it holds the fishing line near the terminal end of the rod blank 22 and guides the fishing line through a plurality of fishing line guides 21 disposed along the surface of the rod blank 22.

The fishing line guides 21 are formed by a material having a high rigidity, such as a stainless steel. In the illustrated embodiment, the fishing line guides 21 comprise a generally annular body 30 supported in a guide frame 33, which is affixed to a ring-like attachment portion 34 adapted wrap around the circumference of the rod blank 22. Because the diameter of the rod blank 22 varies over its length, the ring-like attachment portion 34 on each of the fishing line guides 21 also vary in diameter to fit along the length of the rod blank 22.

The fishing line guides 21 are positioned in spaced-apart relation and preferably decreasing in diameter along the axis of the rod blank 22 toward the terminal end when the rod blank 22 is inserted through the attachment portion of the fishing line guides 21. The number of fishing line guides 21 disposed on the rod blank 22 depends on the length of the rod blank 22, or depends on the amount of fishing line support as desired by the user. Additionally, the fishing line guides 21 are positioned in a spiral configuration around the length of the rod blank 22. Accordingly, none of the fishing line guides 21 are aligned to each other. Rather, the positioning of the fishing guides 21 creates a spiral path along the length of the rod blank 22. In this way, each of the fishing line guides 21 are secured on a specific location on the rod blank 22 and the guides 21 are oriented in different directions. To ensure stability of the fishing line guides 21, the attachment portion may further comprise securing means, such as adhesives, screws, or the like. The fishing line guides 21 may be permanently affixed to the rod blank 22. In alternate embodiments, however, the line guides 21 may be removably attached to the rod blank 22 so that each of the guides 21 are easily replaced when it becomes damaged or worn over time.

The annular body 30 of the fishing line guides 21 is adapted to receive a fishing line therethrough. The fishing line guides 21 guides are preferably low profile so as to minimize snagging during use. Additionally, the low profile fishing line guides 21 hold the fishing line closer to the surface of the rod blank 22. In this way, the present invention improves wind resistance and wind dynamics. The fishing line guides 21 of the present invention may vary in size and shape so that they are suitable for use with various types of fishing lines having different diameter and abrasion resistance. When the fishing line is threaded through the fishing line guides 21, the fishing line wraps in a spiral path created by the positioning of the fishing line guides 21 around the rod blank 22 along its length. In this way, the fishing line reinforces the tensile strength of the rod blank 22 because the pulling force from the end of the fishing line is evenly distributed throughout the length of the rod blank 22.

Figure 2:
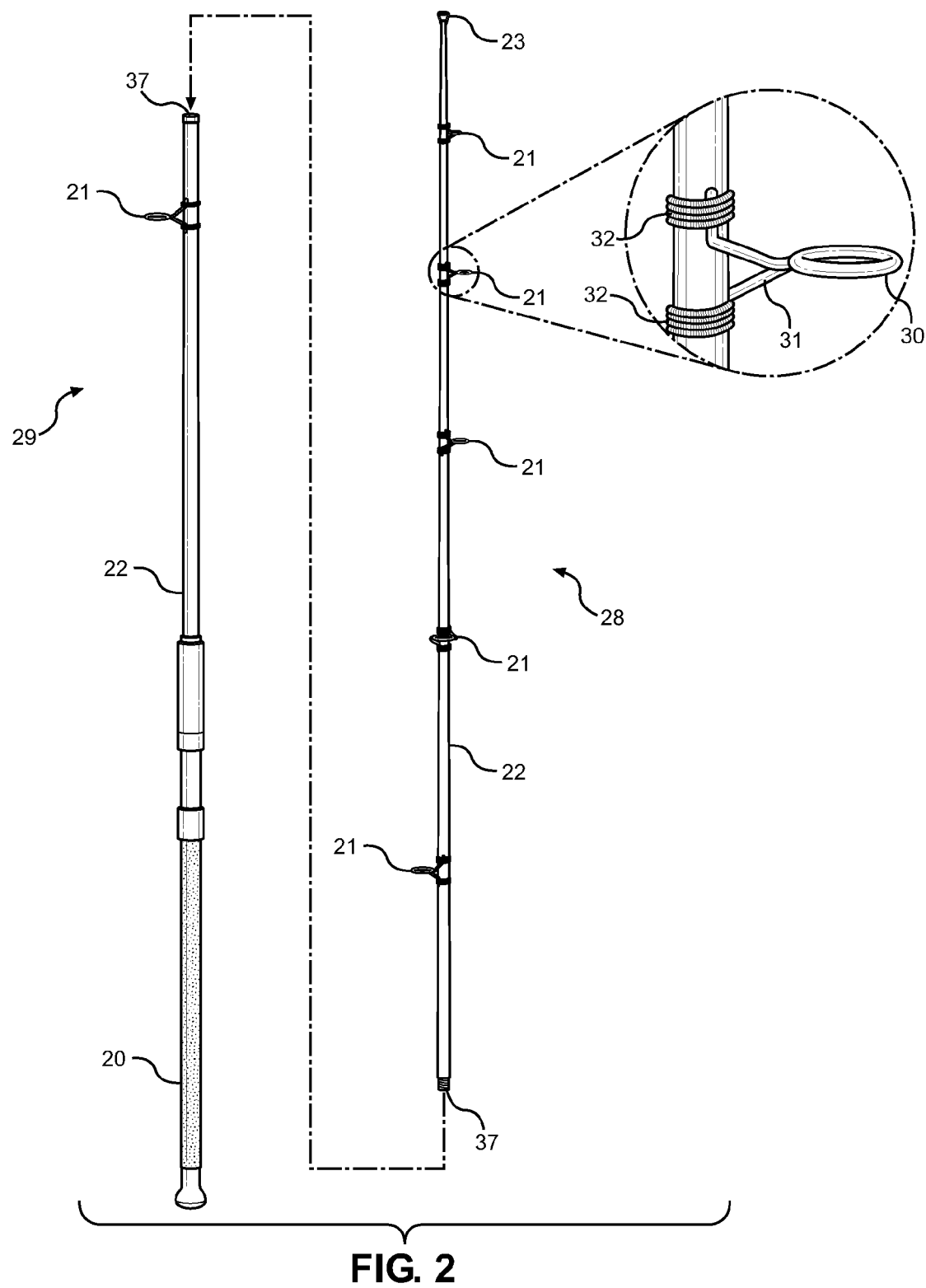
FIG. 2 shows another embodiment of the present invention as shown on a two-piece fishing rod.

Referring now to FIG. 2, there is shown a perspective view of the present invention in use on a multi-piece fishing rod. In the illustrated embodiment, the fishing rod comprises two pieces, but in alternate embodiments, the fishing rod may comprise additional pieces. A first piece 28 includes a top half of the fishing rod and the second piece 29 includes a bottom half of the fishing rod 24. The first piece 28 includes a rod blank 22 having a terminal end and an attachment end, wherein the terminal end includes a tip top 23 similar to that disclosed in the previous embodiment. The attachment end of the first piece 28 includes fastening means such as a threaded element 37 to connect to the second piece 29 of the fishing rod.

The first piece 28 also includes a plurality of fishing line guides 21 disposed in a spiral configuration along the length of the rod blank 22. Each of the fishing line guides 21 in the illustrated embodiment comprises an annular body 30 and an attachment portion 31 that includes a single or a double foot. The fishing line guides 21 are affixed to the rod blank 22 via a single or double footed attachment portion 31. The foot is constructed so that it is perpendicular to the annular body 30 of the fishing line guides 21. In this way, the foot is adapted to rest flushly against the surface of the rod blank 22. In the illustrated embodiment, the fishing line guides 21 are secured the rod blank 22 by wrapping a thread 32 around the foot of the attachment portion 31 and coating it with epoxy. Alternatively, the fishing line guides 21 may be secured to the rod blank 22 by other connecting means known in the art.

The second piece 29 comprises a rod blank 22 having a handle portion 20 and an attachment end. The rod blank 22 of the second piece 29 may include additional fishing line guides 21 in a spiral configuration so that when the first piece 28 and the second piece 29 are connected, the fishing line guides 21 are positioned in a continuous spiral configuration. The handle portion 20 may be press fitted to the working end or attached via a variety of fastening means such as screws or epoxy. The attachment end of the second piece 29 may also comprise a threaded element adapted to receive the threaded element disposed on the attachment end of the first piece 28. In this way, the first piece 28 can be removably connected to the second piece 29, thereby allowing the user to disassemble the two pieces to increase portability of the fishing rod.

Figure 3:
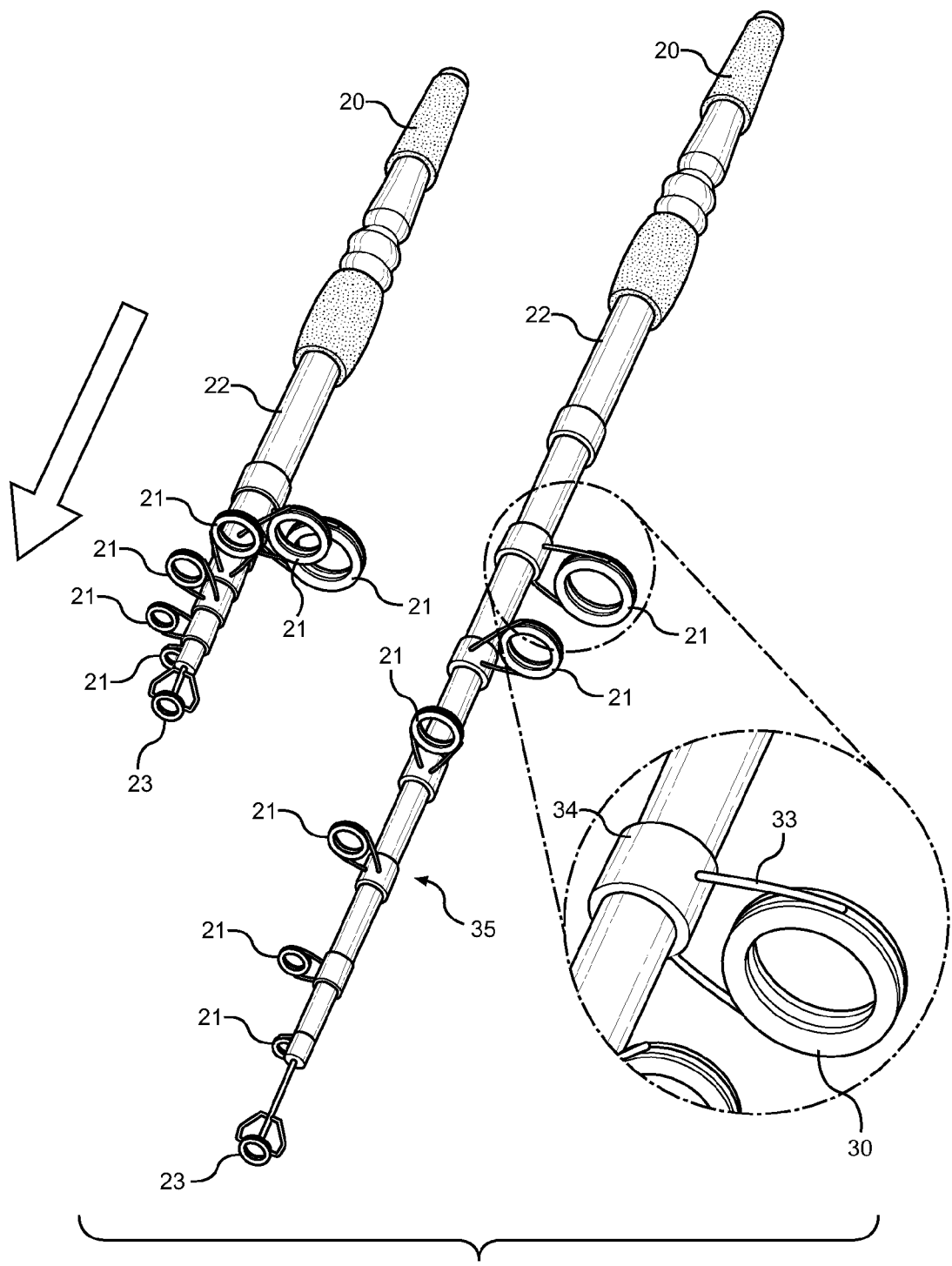
FIG. 3 shows yet another embodiment of the present invention as shown on a telescopic fishing rod.

Referring now to FIG. 3, there is shown a perspective view of the present invention in use with a telescopic fishing rod 35. The telescoping fishing rod 35 includes a rod blank 22 having multiple tapered sections varying diameter having a tapered end and a base end. Each tapered section is hollow and is slideably attached to one another so that a tapered end of a section is attached to a base end of an adjacent section. The rod blank 22 is constructed so that the base end of the largest section is attached to a handle 20 end, and the smallest section is disposed at the opposite end of the fishing rod 35.

In the illustrated embodiment, the fishing line guides 21 each comprise a generally annular body 30 supported in a guide frame 33, which is affixed to a ring-like attachment portion 34 adapted wrap around the tapered end of each of the sections. Because the diameter of each of the tapered ends differ, the ring-like attachment portion 34 on each of the fishing line guides 21 also vary in diameter so that it is adapted to fit onto the tapered ends of each of the sections. The attachment portion 34 may be secured to the tapered portion via securing means such as adhesives, screws, or the like.

Additionally, the fishing line guides 21 are secured in a spiral configuration around each of the tapered ends, and none of the fishing line guides 21 are aligned to each other. In this way, each of the fishing line guides 21 is oriented in different directions when the rod blank 22 is fully extended and collapsed. The rod blank 22 is extended telescopically by moving each section in the direction of the smallest section until each of the sections jams against its adjacent sections. When the rod blank 22 is fully extended, the fishing line guides 21 are positioned in a spiral configuration along the length of the rod blank 22. Conversely, the rod blank 22 is collapsed by moving each section in the direction of the handle 20 until each of the sections jams to respective adjacent sections. When the rod blank 22 is collapsed, the fishing line guides 21 are positioned closely around the tapered ends of each of the sections. Accordingly, the location of the fishing line guides 21 do not interfere with the functionality of the telescopic mechanism of the fishing rod 35.

Figure 4:
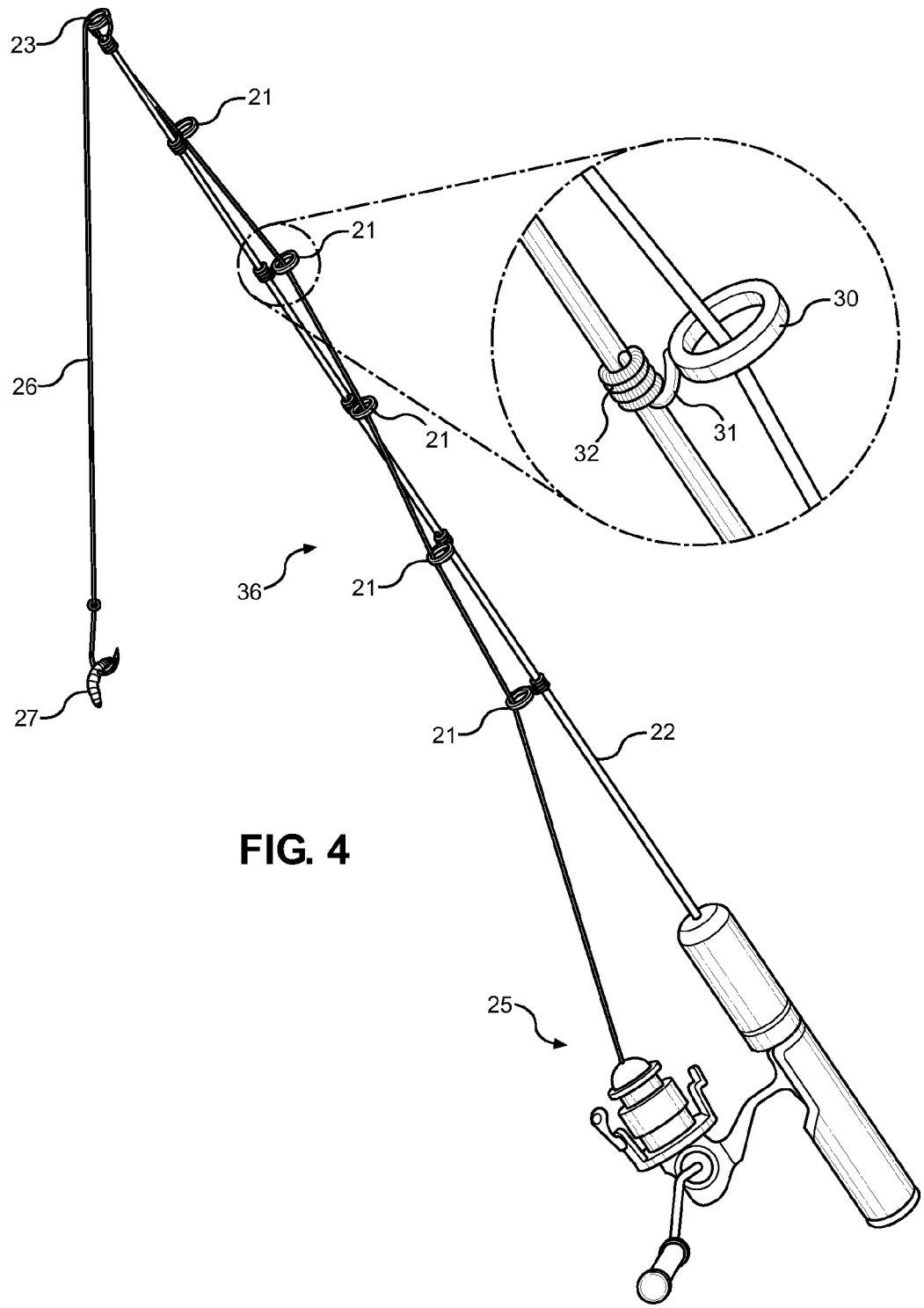
FIG. 4 shows a perspective view of still another embodiment of the present invention having a fishing line through the fishing line guides disposed around the fishing rod.

Referring now to FIG. 4, there is shown a perspective view of another embodiment of the fishing rod 36 of the present invention as used with a reel 25. The elongated rod blank 22 of the illustrated embodiment is flexible and thinner in diameter, which is more suitable for casting a lightweight bait 27. The elongated rod blank 22 includes a terminal and a working end, wherein the terminal end includes a tip top 23 similar to that disclosed in the previous embodiments. The working end is attached to a handle 20, wherein the handle 20 of the illustrated embodiment includes a reel seat and a reel 25 secured thereon. The reel 25 and the real seat are preferably formed of metal, but may comprise other suitable material. The handle 20 made be integrally formed with the rod blank 22. The handle 20 further comprises a slip-resistant, cushioned surface to improve control and grip of the fishing rod 36. The handle 20 may also be ergonomically shaped to increase the gripping surface and to suit preferences of the user.

The reel 25 comprises a spinning reel having a spool on which fishing line 26 can be wound. Based on the needs of the user, the present invention may also be used with other types of fishing reels, including a fly reel, centrepin reel, baitcasting reel, spin cast reel, underspin reel, and a conventional reel. The reel 25 is adapted to wind the fishing line 26 via a rotatable reel handle that is integrally constructed with the reel 25 or adhesively secured to the same. In this way, the reel 25 assists in retrieving excess fishing line 26 during use and storage.

The rod blank 22 of the illustrated embodiment is suitable for use with smaller fishing line guides 21, wherein each of the fishing line guides 21 comprises an annular body 30 and an attachment portion 31 that includes a single or a double foot. The fishing line guides 21 are affixed to the rod blank 22 via a single or double footed attachment portion 31. The foot is constructed so that it is perpendicular to the annular body 30 of the fishing line guides 21. In this way, the foot is adapted to rest flushly against the surface of the rod blank 22. In the illustrated embodiment, the fishing line guides 21 are secured the rod blank 22 by wrapping a thread 32 around the foot of the attachment portion 31 and coating it with epoxy. Alternatively, the fishing line guides 21 may be secured to the rod blank 22 by other connecting means known in the art. Similar to the first embodiment, the fishing line guides 21 are low profile so that the guides 21 sit close to the surface of the fishing rod. In this way, the fishing line guides 21 are less likely to be snapped off during use or snag onto extraneous objects. The specific shape of the fishing line guides 21 and its attachment portion 31, however, is not of primary relevance with regard to the intent of the present invention, which portends to provide an improved positioning of the fishing line guides 21 along the length of the fishing rod blank 22.

Traditional rods having fishing line guides 21 in a linear configuration concentrate the pulling force to one side of the fishing rod 36, which can cause the rod blank 22 or the fishing line 26 to easily break. To solve this problem, the fishing line guides 21 of the present invention are incrementally spaced in a spiral configuration around the length of the rod blank 22. As the fishing line guides 21 are adapted to receive a fishing line 26 therethrough, the gradual spiral configuration along the length of the rod blank 22 enables fishing line 26 to be wound around the rod blank 22, reinforcing the tensile strength of the same. Additionally, the positioning of the fishing line guide 21 changes the position to which weight is distributed when a fish is pulling on the fishing line 26. As the tensile strength of the rod blank 22 is reinforced and the weight of the pulling force is distributed throughout the rod blank 22, the present invention reduces rod and line breakage.

The spiral path of the fishing line around the rod blank 22 also discourages the fishing line from tangling or twisting, wherein the same could lead to line memory. This could be especially problematic as the tangled and twisted fishing lines can cause the reel 25 to jam or malfunction. Because the spiral path of the fishing line guides 21 prevent the fishing line 26 from tangling or twisting, the fishing line 26 is easily casted into the water when the user flicks the fishing rod 36 from behind toward the water. As a result, the present invention makes casting more efficient by improving both casting distance and accuracy.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod, comprising:
    an elongated rod blank having a working end and a terminal end;
    said working end attached to a handle;
    a plurality of fishing line guides incrementally spaced along the length of said rod blank;
    wherein said plurality of fishing line guides is positioned around said rod blank in a spiral configuration;
    wherein said spiral configuration comprises a continuous spiral path in which each of said plurality of fishing line guides are facing a different direction from a previous fishing line guide;
    said plurality of fishing line guides having a body and an attachment portion, wherein said attachment portion of said plurality of fishing line guides is attached to said rod blank;
    said body of said plurality of fishing line guides adapted to receive a fishing line therethrough.

2. The fishing rod of claim 1, wherein said handle further comprises a reel seat.

3. The fishing rod of claim 2, further comprising a reel.

4. The fishing rod of claim 1, wherein said rod blank further comprises a tip top near said terminal end.

5. The fishing rod of claim 1, wherein said attachment portion of said plurality of fishing line guides is removably attached to said rod blank.

6. The fishing rod of claim 1, wherein said handle further comprises a high friction surface adapted to provide a comfortable and secure gripping.

7. The fishing rod of claim 1, wherein said rod blank is a tapered shaft having a circular cross section with a diameter that varies over a length of said rod blank.

8. The fishing rod of claim 1, wherein said attachment portion of said plurality of fishing line guides comprises a single foot adapted to rest directly on said rod blank.

9. The fishing rod of claim 1, wherein said attachment portion of said plurality of fishing line guides comprises a double foot adapted to rest directly on said rod blank.

10. The fishing rod of claim 1, wherein said attachment portion of said plurality of fishing line guides comprises a ring adapted to slide onto said rod blank.

11. The fishing rod of claim 1, wherein said rod blank is telescopic.

12. The fishing rod of claim 1, wherein said rod blank comprises:
    a plurality of tapered sections having a tapered end and a base end;
    a plurality of fishing line guides, said plurality of fishing line guides attached to said tapered end.

13. The fishing rod of claim 1, wherein said rod blank comprises at least two sections removably connected to each other.

14. The fishing rod of claim 13, further comprising:
    a first section and a second section;
    each of sections having a terminal end and an attachment end;
    said attachment end comprising threaded element adapted to connect said first section and said second section.

15. The fishing rod of claim 1, wherein said plurality of fishing line guides each comprises an annular body.

16. The fishing rod of claim 1, wherein said plurality of fishing line guides is spaced evenly along said rod blank.

17. The fishing rod of claim 1, wherein said plurality of fishing line guides is spaced at successively smaller increments towards said terminal end of said rod blank.

* * * * *